United States Patent [19]
Yasuda et al.
[11] Patent Number: 4,842,371
[45] Date of Patent: Jun. 27, 1989

[54] LIQUID CRYSTAL DISPLAY DEVICE HAVING INTERLACED DRIVING CIRCUITS FOR DRIVING ROWS AND COLUMNS ONE-HALF CYCLE OUT OF PHASE

[75] Inventors: Shuhei Yasuda; Yutaka Takafuji, both of Nara, Japan

[73] Assignee: Sharp Kabushiki Kaisha, Osaka, Japan

[21] Appl. No.: 181,377

[22] Filed: Apr. 14, 1988

[30] Foreign Application Priority Data

| | | | |
|---|---|---|---|
| Apr. 15, 1987 | [JP] | Japan | 62-92903 |
| May 18, 1987 | [JP] | Japan | 62-120690 |
| May 20, 1987 | [JP] | Japan | 62-123219 |
| Jun. 15, 1987 | [JP] | Japan | 62-148844 |

[51] Int. Cl.[4] .......... G02F 1/13
[52] U.S. Cl. .......... 350/333; 340/765; 340/784; 340/805
[58] Field of Search .......... 350/333; 340/765, 784, 340/805

[56] References Cited

U.S. PATENT DOCUMENTS

| | | | |
|---|---|---|---|
| 4,158,860 | 6/1979 | Irie et al. | 350/333 X |
| 4,485,380 | 11/1984 | Soneda et al. | 350/333 X |
| 4,688,896 | 8/1987 | Castleberry | 350/333 |
| 4,701,026 | 10/1987 | Yazaki et al. | 350/333 |
| 4,702,560 | 10/1987 | Endo et al. | 350/333 |
| 4,709,995 | 12/1987 | Kuribayashi et al. | 350/333 X |
| 4,746,196 | 5/1988 | Umeda et al. | 350/333 X |
| 4,746,197 | 5/1988 | Endo et al. | 350/333 X |

*Primary Examiner*—Stanley D. Miller
*Assistant Examiner*—Richard Gallivan
*Attorney, Agent, or Firm*—Birch, Stewart, Kolasch & Birch

[57] ABSTRACT

An active matrix liquid crystal display device operable on an interlaced scanning scheme and having a plurality of liquid crystal cells and switching active elements for driving the liquid crystal cells. The liquid crystal cells and the switching active elements are arranged in a matrix fashion having rows and columns intersecting with each other. The display device comprises a plurality of sets of rows, each set being comprised of neighboring members of the rows of the matrix; a scanning unit for scanning each set with an interlaced scanning signal during any field, odd-numbered source lines each connected with one of the row forming the respective set, even-numbered source lines each connected with the other of the row forming the respective set; and a signal applying unit for applying an odd-numbered field signal to the odd-numbered source line during any field time and for applying an even-numbered field signal to the even-numbered source line during any field time.

22 Claims, 13 Drawing Sheets

*Fig. 18*

| Rows \ Columns | | F1 (1st Col. 2nd Col. 3rd Col. 4th Col.) | F2 (1st Col. 2nd Col. 3rd Col. 4th Col.) | F3 (1st Col. 2nd Col. 3rd Col. 4th Col.) | F4 (1st Col. 2nd Col. 3rd Col. 4th Col.) |
|---|---|---|---|---|---|
| 1st Row | Picture Element Electrode | (Ba) + − + − | (Be) + − + − | (Bi) − + − + | (Bm) − + − + |
| | Data Bus Electrode | ⊖ ⊕ ⊖ ⊕ | ⊖ ⊕ ⊖ ⊕ | ⊕ ⊖ ⊕ ⊖ | ⊕ ⊖ ⊕ ⊖ |
| 2nd Row | Picture Element Electrode | (Bb) + − + − | (Bf) − + − + | (Bj) − + − + | (Bn) + − + − |
| | Data Bus Electrode | ⊖ ⊕ ⊖ ⊕ | ⊕ ⊖ ⊕ ⊖ | ⊕ ⊖ ⊕ ⊖ | ⊖ ⊕ ⊖ ⊕ |
| 3rd Row | Picture Element Electrode | (Bc) + − + − | (Bg) + − + − | (Bk) − + − + | (Bo) − + − + |
| | Data Bus Electrode | ⊖ ⊕ ⊖ ⊕ | ⊖ ⊕ ⊖ ⊕ | ⊕ ⊖ ⊕ ⊖ | ⊕ ⊖ ⊕ ⊖ |
| 4th Row | Picture Element Electrode | (Bd) + − + − | (Bh) − + − + | (Bl) − + − + | (Bp) + − + − |
| | Data Bus Electrode | ⊖ ⊕ ⊖ ⊕ | ⊕ ⊖ ⊕ ⊖ | ⊕ ⊖ ⊕ ⊖ | ⊖ ⊕ ⊖ ⊕ |

LIQUID CRYSTAL DISPLAY DEVICE HAVING INTERLACED DRIVING CIRCUITS FOR DRIVING ROWS AND COLUMNS ONE-HALF CYCLE OUT OF PHASE

BACKGROUND OF THE INVENTION

1. Field of the Invention

The present invention generally relates to liquid crystal display devices, and more particularly, to a liquid crystal display device adapted to be driven by a television signal.

2. Description of the Prior Art

FIG. 19 of the accompanying drawings illustrates, in the form of an equivalent circuit, the typical prior art liquid crystal display device. Reference to FIG. 19 will now be described for the purpose of discussing of the prior art which is believed to be pertinent to the present invention.

The prior art liquid crystal display device shown in FIG. 19 comprises a plurality of liquid crystal cells 1, each shown in the form of an equivalent capacitor, its display electrodes 2 and its mating counter electrodes 3. A thin film transistor 4 of MIS structure is connected to each liquid crystal cell 1 as a switching active element for driving the respective liquid crystal cell 1. In practice, the liquid crystal cells 1 and the thin film transistors 4 are arranged in a matrix having a plurality of, for example, four, rows of source lines S1, S2, S3 and S4 and a plurality of, for example, four, columns of control lines G1, G2, G3 and G4, only a portion of which is shown in FIG. 19. As shown, the transistors 4 in each of the first through fourth rows have their gates connected to the associated control line G1, G2, G3 or G4. The first through fourth control lines are adapted to be scanned according to an interlaced scanning scheme so that the first and third control lines G1 and G3 can be excited by odd-numbered line scanning of the television signal whereas the second and fourth control lines G2 and G4 can be excited by even-numbered line scanning of the same television signal. A predetermined voltage inverted for each frame is applied to the counter electrodes of the respective liquid crystal cells 1 as a drive voltage.

Video signals (for example, R, G and B signals) to be displayed are supplied through the source lines S1 to S4.

During the odd-numbered field of the television signal, the first and third control lines are successively excited by a scanning signal (line sequence pulses conforming to a horizontal synchronizing signal) so that a video signal voltage can be sequentially applied to the liquid crystal cells in the first row and the liquid crystal cells in the third row. At this time, the transistors in each of the second and fourth rows are switched off.

During the even-numbered field of the television signal, the second and fourth rows are sequentially scanned with the consequence that the video signal is applied to the liquid crystal cells in the second and fourth rows. At this time, the transistors in each of the first and third rows are switched off and the signal in the odd-numbered field is retained.

During the subsequent frame, the polarity of the voltage applied between the electrodes 2 and 3 of the liquid crystal cells 1 is reversed. In such case, the liquid crystal drive frequency will be 15 Hz if a television signal according to NTSC system is used to drive the liquid crystal cells. This is partly because the television signal is based on the interlaced scanning scheme in which the odd-numbered and even-numbered horizontal lines of the screen are scanned for each different field and partly because the electric field applied to the liquid crystal cells 1 is required to be cyclically reversed during the liquid crystal cells' lifetime. Considering one picture element for facilitating a better understanding, the application of a positive voltage between both electrodes of each cell is repeated at intervals of four fields. This is because the picture element referred to above is, after having been scanned at a n-th field, not scanned during the next succeeding field, the (n+1)th field for the purpose of interlacing; but will be scanned at the subsequent (n+2)th field while being applied with a negative voltage during the lifetime of the liquid crystal cells; and will not be scanned during the next succeeding field, (n+3)th field, for the purpose of interlacing. At the (n+4)th field, the liquid crystal cell of the picture element is again applied with a positive voltage. Thus, the application of the positive voltage to each liquid crystal cell takes place at intervals of the four fields which, in terms of the drive frequency, correspond to 15 Hz according to the NTSC system or 12.5 Hz according to the PAL system.

In the prior art liquid crystal display device of the above discussed construction, in view of the fact that the liquid crystal cells are alternately driven, the liquid crystal drive frequency will become one half the frame frequency, that is, 15 Hz, when display is effected based on the interlaced scanning scheme. While the frequency of 30 Hz will not be perceived as a flicker by human eyes, the frequency of 15 Hz is recognized as a flicker appearing on the screen and, as a result, a picture uncomfortable to look will be reproduced. In order to substantially avoid this problem, a drive method has been suggested wherein the combination of the two rows is changed for each field so that every two rows can be simultaneously driven by the same video signal. According to this suggested method, although the drive frequency can be improved to 30 Hz, no improvement has been made in the number of effective display scanning lines per field. Specifically, assuming that the number of the effective display scanning lines driven by the same signal is 480 lines, the number of the effective display scanning lines per field remains 240 lines and, accordingly, the vertical resolution is still insufficient.

Another method suggested to substantially avoid the above discussed problem is that the use is made of a frame memory so that an image data corresponding to two video signal lines can be displayed during the scanning period of one horizontal scanning line Gi (i=1 to m). However, this method has problems in that the use of a memory having a large memory capacity corresponding to the number of the display liquid crystal cells c is required and that a high speed is required in the clock frequency for a drive driver to drive the active elements, resulting in the increased manufacturing cost.

SUMMARY OF THE INVENTION

Accordingly, the present invention has been developed with a view to providing an improved liquid crystal device effective to substantially eliminate the above discussed problems inherent in the prior art liquid crystal display devices.

Another important objective of the present invention is to provide an improved active matrix type liquid crystal display device of the type referred to above, which is effectively accomplishes a reproduction of a picture with no occurrence of flickering and without the vertical resolution being lowered.

A further objective of the present invention is to provide an improved liquid crystal display device of the type referred to above, which does not require the use of a memory having a large memory capacity and the high speed clock frequency.

A still further objective of the present invention is to provide an improved liquid crystal display device of the type referred to above, wherein a bias voltage is applied to the counter electrodes in correspondence with the polarity of the video signal then reversed for each neighboring liquid crystal cells thereby accomplishing a high-contrast picture reproduction without the occurrence of flickering.

A yet further objective of the present invention is to provide an improved liquid crystal display device of the type referred to above, wherein no possible short circuiting will occur at each line intersection and wherein a high contrast ratio can be obtained even though the drive voltage is relatively low.

In one aspect of the present invention, there is provided an active matrix liquid crystal display device operable on an interlaced scanning scheme and having a plurality of liquid crystal cells and switching active elements for driving the liquid crystal cells, the liquid crystal cells and the switching active elements being arranged in a matrix fashion having rows and columns intersecting with each other, which device comprises a plurality of sets of rows, each set of rows comprises of neighboring members of the rows of the matrix; means for scanning each set of rows with an interlaced scanning signal at any fields, odd-numbered source lines each connected with one of the row forming the respective set, even-numbered source lines each connected with the other of the row forming the respective set; and means for applying an odd-numbered field signal to the odd-numbered source line during any field time and for applying an even-numbered field signal to the even-numbered source line during any field time.

According to the above described construction, each set of the neighboring rows can be scanned according to the interlaced scanning scheme, and one of the neighboring rows and the other of the neighboring rows are applied with odd- and even-numbered field signals during any field time, respectively. Accordingly, when one picture element is taken into consideration, it can be scanned during any field time and, therefore, the voltages applied to the opposite electrodes of the liquid crystal cells per field can be reversed in polarity. This means that the driving frequency is 30 Hz. Moreover, since the odd- and even-numbered field signals are respectively applied to the respective set of the neighboring rows, 480 scanning lines can be utilized per field if the number of effective display scanning lines is assumed to be 480 lines. Also, the scanning time per row corresponds to one horizontal period and, therefore, no high speed characteristic is required.

In another aspect of the present invention, there is provided an active matrix liquid crystal display device including a plurality of rows of video signal lines, a plurality of columns of scanning lines, the rows of the video signal line and the columns of the scanning lines being arranged in a matrix fashion, a picture element electrode disposed at each intersecting point between the rows and the columns and adapted to receive a video signal through an active element, the device being adapted to be scanned according to an interlaced scanning scheme by a signal supplied through the scanning lines, the device comprises the video signal lines having a plurality of pairs of first video signal lines and a plurality of pairs of second video signal lines; a first video signal supply means for supplying a first video signal to the first video signal lines; a second video signal supply means for supplying a second video signal to the second video signal lines, the second video signal having a phase displaced of a half-cycle period relative to the first video signal; a scanning signal supply means for supplying a scanning signal to each of a plurality of sets of odd- and even-numbered scanning lines; and first and second picture element electrodes to which the first and second video signals are respectively applied, the first and second picture element electrodes being arranged and displaced at a half-cycle period from each other in a direction of the scanning line.

According to the above described construction, the first and second video signals have their phases displaced a half-cycle period from each other, and the first and second picture element electrodes are arranged while displaced a half-cycle period in a direction conforming to the scanning line so that each neighboring odd- and even-numbered scanning lines can be scanned. Therefore, a televised picture substantially free from the occurrence of flickers can be displayed.

In a further aspect of the present invention, there is provided an active matrix liquid crystal display device including a plurality of rows of video signal lines, a plurality of columns of scanning lines, the rows of the video signal line and the columns of the scanning lines being arranged in a matrix fashion, a picture element electrode disposed at each of intersecting points between the rows and the columns and adapted to receive a video signal through an active element, the device being adapted to be scanned according to an interlaced scanning scheme by a signal supplied through the scanning lines, the device comprises a scanning signal supply means for supplying a signal to each of the scanning lines; a first video signal supply means for supplying a first video signal to the odd-numbered columns of the video signal lines; a second video signal supply means for supplying a second video signal to the even-numbered columns of the video signal lines, the second video signal having a phase displacement of a half-cycle period relative to the first video signal; first and second picture element electrodes to which the first and second video signals are respectively applied; a first counter electrode confronting each of the first picture element electrodes; a second counter electrode confronting each of the second picture element electrodes; a first counter electrode signal supply means for supplying a first counter electrode signal to the first counter electrodes; and a second counter electrode signal supply means for supplying a second counter electrode signal to the second counter electrodes, the second counter electrode signal having a phase displacement of a half-cycle period relative to the first counter electrode signal.

According to the above described construction, since the first and second video signals have their phases displaced a half-cycle period from each other and the first and second counter electrodes are arranged while displaced a half-cycle period in phase from each other, it is possible to apply a bias voltage to the counter electrodes with respect to the polarity of the video signal which is reversed for each of the odd- and even-numbered lines of the video signal. Therefore, a televised picture can be displayed at a relatively high contrast with no flicker being accompanied.

In a still further aspect of the present invention, there is provided an active matrix liquid crystal display device which has a first insulating substrate formed with thin film transistors, gate bus electrodes, common line electrodes and picture element electrodes which do not intersect with the gate bus electrodes, a second insulating substrate formed with data bus electrodes so as to confront the first insulating substrate and so as to intersect the gate bus electrodes, and a layer of liquid crystal intervening between the first and second insulating substrates, the device comprises each of the thin film transistors, which are connected to the same gate bus electrodes, having source and drain electrodes, one of the source and drain electrodes being connected with the picture element electrode and the other of the source and drain electrodes being alternately connected with two common line electrodes confronting with each other with the gate electrode intervening between then, the two common line electrodes being applied with voltages different in polarity from each other.

According to the above described construction, each of the thin film transistors in each row is alternately applied with positive and negative voltages supplied through the paired common line electrodes. In correspondence with this, the data bus electrodes which act as counter electrodes are also alternately applied with negative and positive data signal voltages. By way of example, in the case of the television image according to the interlaced scanning scheme, the reversing of the applied voltages to the paired common line electrodes and the reversing of the data signal voltages take place for each field at a frequency of 15 Hz. However, considering the screen as a whole, a combination of the positive and negative polarities varies for each field such that the positive charged picture elements and the negative charged picture elements are equal in number with each other while neighboring with each other, and therefore, the flickering frequency will be apparently 60 Hz enough to substantially eliminate the occurrence of flickers in the televised picture.

BRIEF DESCRIPTION OF THE DRAWINGS

These and other objectives and features of the present invention will become readily understood from the following description taken in conjunction with its preferred embodiments thereof with reference to the accompanying drawings, in which:

FIG. 18 is a chart showing effects derived when a televised image is scanned according to an interlaced scanning scheme by alternating voltage drive in the device according to the fourth embodiment of the present invention.

DETAILED DESCRIPTION OF THE EMBODIMENTS

Figure 1:
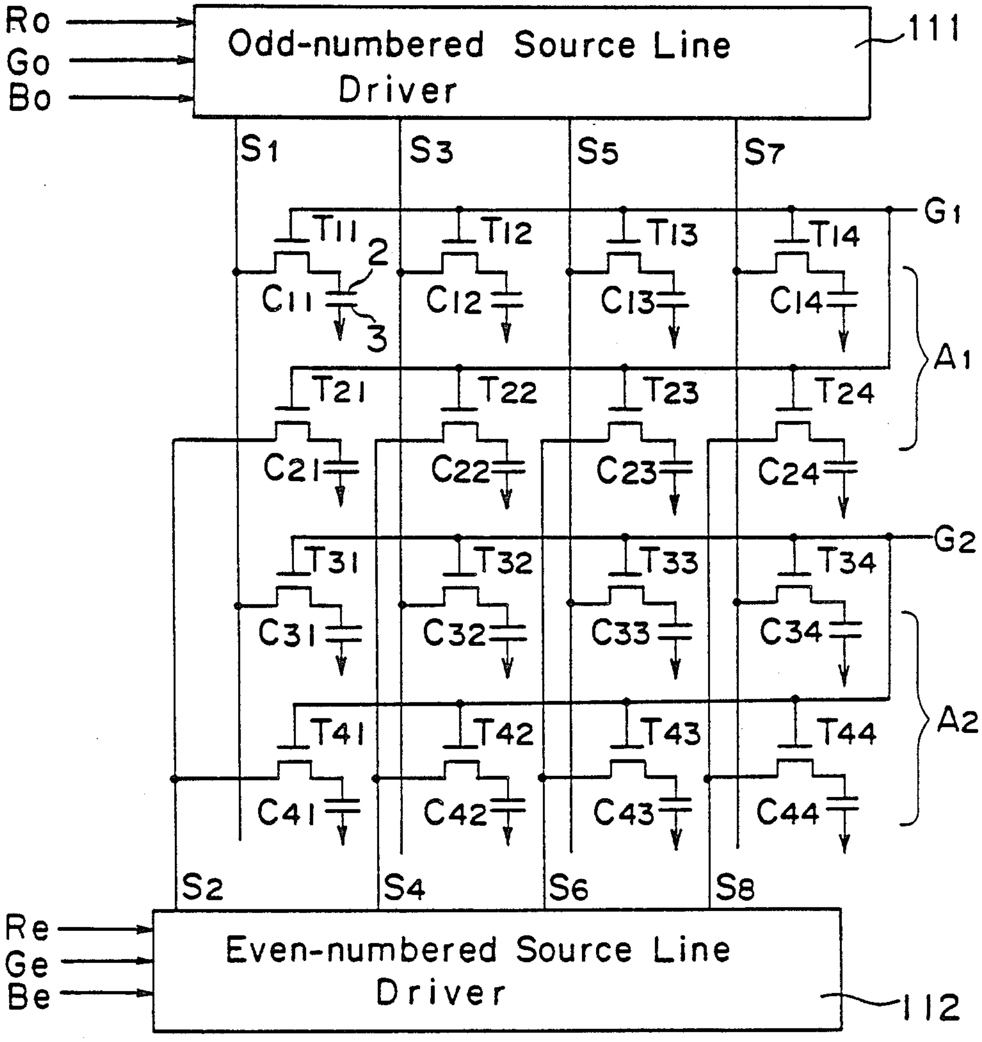
FIG. 1 is an equivalent circuit diagram of a liquid crystal display device according to a first preferred embodiment of the present invention.
Figure 2:
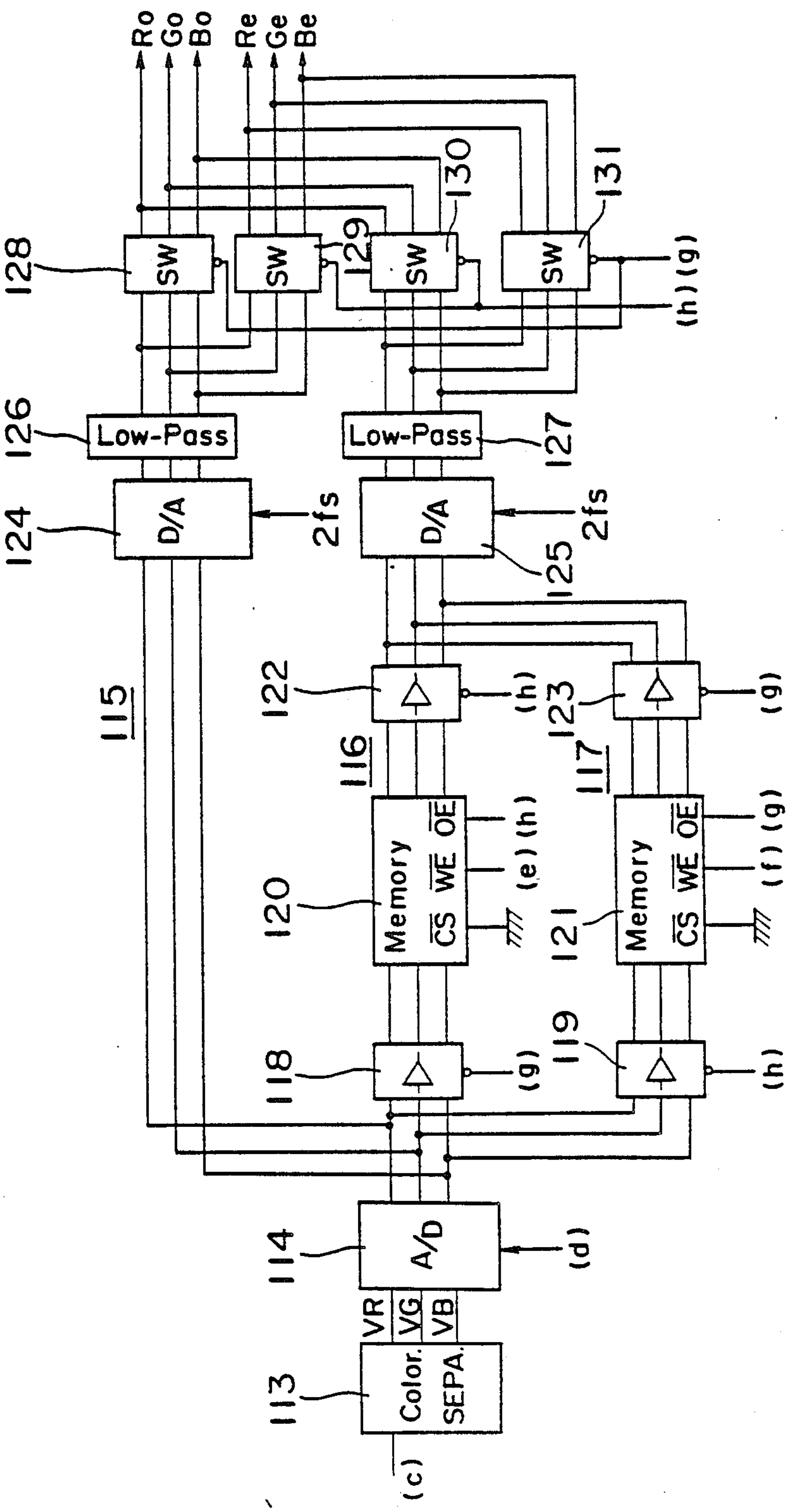
FIG. 2 is a circuit block diagram showing the details of a signal processing unit employed in the liquid crystal display device of FIG. 1.

Referring first to FIGS. 1 and 2, a plurality of liquid crystal cells C11 to C44 and a corresponding number of thin film transistors T11 to T44 are arranged in matrix form having rows and columns, each neighboring rows being paired to provide a corresponding row line pair Al and A2, each row line pair Al and A2 being adapted to be driven by a respective interlaced scanning signal. Accordingly, gate electrodes of the transistors T11 to T14 and T21 to T24 in the first and second rows, respectively, are connected to first control line G1 and, similarly, gate electrodes of the transistors T31 to T34 and T41 to T44 in the third and fourth rows, respectively, are connected to a second control line G2. Reference numeral 111 represents an odd-numbered source line driver having output signal lines S1, S3, S5 and S7 which are connected to respective source electrodes of the transistors in one of the neighboring rows forming the respective row pair, for example, in the first and third rows. Reference numeral 112 represents an odd-numbered source line driver having output signal lines S2, S4, S6 and S8 which are connected to respective source electrodes of the transistors in the other of the neighboring rows forming the respective row pair, that is, in the second and fourth rows.

The odd-numbered source line driver 111 is adapted to receive red, green and blue signals; Ro, Go, and Bo; of odd-numbered fields. Since the liquid crystal cells shown in FIG. 1 form each color picture element as shown in FIG. 5, the red signal Ro is outputted through the output lines S1 and S7, the green signal Go is outputted through the output line S3 and the blue signal Bo is outputted through the output line S5. On the other hand, the odd-numbered source line driver 112 is adapted to receive red, green and blue signals; Re, Ge, and Be; of even-numbered fields and, therefore, the red signal, Re; the green signal, Ge; and the blue signal, Be, are outputted through the output lines S2 and S8, the output line S4, and the output line S6, respectively. Although not exclusively limited thereto, the associated signals are assumed to be outputted through the output lines S1, S3, S5 and S7 as well as the output lines S2, S4, S6 and S8 on a time series basis. For this reason, each of the source line drivers 111 and 112 includes shift registers for providing the inputs sequentially to the output lines and also includes a respective inverting means for inverting the input signals for each scanning line as shown by the waveform (d) in FIG. 4.

While the odd-numbered source line driver 111 is inputted during any field time with signals of odd-numbered fields and, similarly, the even-numbered source line driver 112 is inputted during any field time with signals of even numbered fields, a circuit necessary to supply the signals to the odd- and even-numbered source line drivers 111 and 112 is best illustrated in FIG. 2.

In FIG. 2, reference numeral 13 represents a color separator for separating red, green, and blue signals; VR, VG, and VB, from a video signal (c) and outputting the red, green and blue signals; VR, VG, and VB; to an analog-to-digital (A/D) converter 114 operable to convert each of those signals into a digital amount. Digital outputs from the A/D converter 114 are then supplied through real time lines 115, first delay lines 116 and second delay lines 117. The real time lines 115 include a digital-to-analog (D/A) converter 124 for converting the digital amount into an analog amount, a low-pass filter 126 and first and second analog gates 128 and 129, and the red, green, and blue signals; Ro, Go, and Bo; of the odd-numbered fields which have been converted into respective analog amounts are supplied to the odd-numbered source line driver 111 through the first analog gate 128 whereas the red, green, and blue signals; Re, Ge, and Be, of even-numbered fields which have been converted into respective analog amounts are supplied to the even-numbered source line driver 112 through the second analog gate 29.

Each of the first and second delay lines 116 and 117 includes a digital gate 118 or 119, a field memory 120 or 121 and a digital gate 122 or 123, the digital gates 122 and 123 on the first and second delay lines 116 and 117 being in turn connected to both of third and fourth analog gates 130 and 131 through a digital-to-analog converter 125 and then through a low pass filter 127. The third analog gate 130 has a function of providing the odd-numbered source line driver 111 with one-field preceding odd-numbered field signals whereas the fourth analog gate 131 has a function of providing the even-numbered source line driver 112 with one-field preceding even-numbered field signals. Since the A/D converter 114 converts each color signal into an 8-bit digital amount, the digital circuit shown in FIG. 2 is effective to perform an 8-bit processing for each color signal.

The memories 120 and 121 are operable to store respective color signal data of the odd- and even-numbered fields, respectively. When the color signal is written in the memory 120 during the odd-numbered field, the memory 121 reads out the color signal data of the one-field preceding even-numbered fields. Accordingly, during the odd-numbered field, the signal of the odd-numbered field is applied to the odd-numbered source line driver 111 through the real time lines 115, whereas the one-field preceding evennumbered field signal read out from the memory 121 is supplied to the even-numbered source line driver 112. At this time, the signal of the odd=numbered field is written in the memory 120. During the subsequent even-numbered field, the signal of the even-numbered field is supplied to the even-numbered source line driver 112 through the real time lines 115, whereas the one-field preceding odd-numbered field signal read out from the memory 120 is supplied to the odd-numbered source line driver 111. At this time, the signal of the even-numbered field is written in the memory 121. It is to be noted that, although in FIG. 2 the A/D conversion and the subsequent D/A conversion are successively accomplished, and since the first and second delay lines 116 and 117 are digital circuits, the real time signal on the real time lines 115 may be equally affected as in the signal processed through the digital circuits, and the outputs from the color separator 113 may be supplied directly to the first and second analog gates 128 and 129 where such a consideration is not required. Also, where each of the memories 120 and 121 are employed in the form of an analog memory such as a charge-coupled device, no digital processing is required accordingly.

Figure 3:
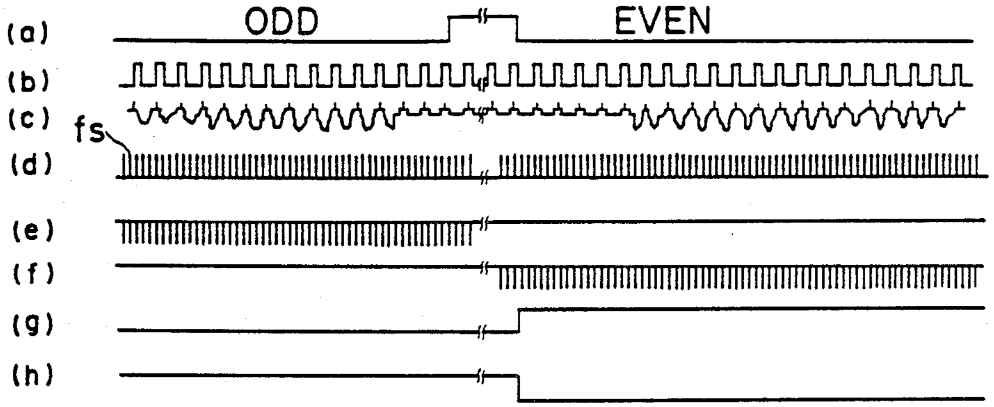
FIG. 3 is a chart showing respective waveforms of various signals appearing in the circuit of FIG. 2.

FIG. 3 illustrates a chart of respective waveforms of gate signals appearing in the circuit of FIG. 2. In FIG. 3, the waveform (a) represents a vertical synchronizing signal contained within the video signal, wherein ODD and EVEN stand for odd-numbered and even-numbered fields, respectively; the waveform (b) represents a horizontal scanning signal in which equalizing pulses are not shown; the waveform (c) represents the video signal being applied to the color separator 113; and the waveform (d) represents sampling pulses of the A/D converter 114 having a frequency expressed by fs. Each of the D/A converters 124 and 125 performs an oversampling at a frequency 2 fs, twice the frequency fs, to smooth the converted waveform. The waveform (e) represents a write-in signal to be written in the memory 120 during the odd-numbered field; the waveform (f) represents a write-in signal to be written into the memory 121 during the even-numbered field; the waveform (g) represents a conduction control signal to be applied to the gates 118 and 123 during the odd-numbered field; and the waveform (h) represents a conduction control signal to be applied to the gates 119 and 122 during the even-numbered field.

Figure 4:
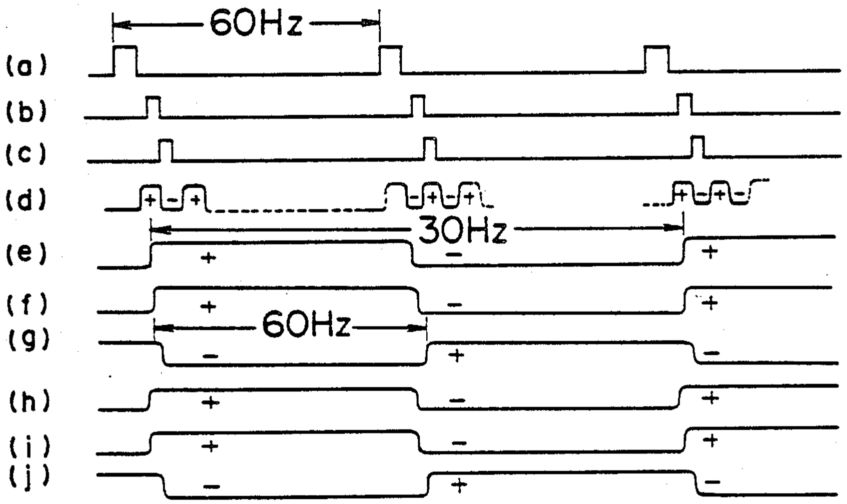
FIG. 4 is a chart showing respective waveforms of various signals used to drive the liquid crystal display device of FIG. 1.
Figure 5:
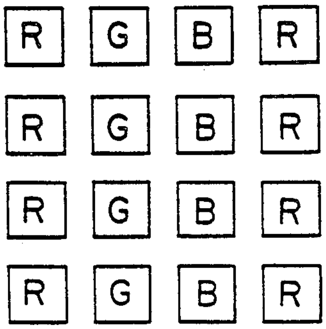
FIG. 5 is a schematic diagram showing an arrangement of picture elements corresponding to the arrangement of electrodes in the liquid crystal display device shown in FIG. 1.

While the odd- and even-numbered field color signals are supplied to the odd- and even-numbered source line drivers 111 and 112, respectively, from the circuit shown in and described with reference to FIG. 2, drive signals for respective circuit components of FIG. 1 are shown in FIG. 4. In FIG. 4, a waveform (a) represents a vertical synchronizing signal; waveforms (b) and (c) represent scanning signals applied respectively to the first and second control lines G1 and G2; and a waveform (d) represents the polarity of the color signals supplied from the odd- and even-numbered source line drivers 111 and 112 to the respective source electrodes of the transistors through the output lines S1, S3, S5 and S7 and the output lines S2, S4, S6 and S8. Waveforms (e), (f), (g), (h), (i) and (j) represent examples of the drive voltages applied to the counter electrode 103 of the liquid crystal cells C11, C21, C31, C12, C22 and C32, respectively, each of the drive voltages being reversed in polarity during each field. Accordingly, the driving frequency is 30 Hz and, hence, no flicker will occur. Moreover, since in the illustrated embodiment, the video signal (color signals), too, is reversed for each line as shown by the waveform (d) in FIG. 4, the occurrence of the flicker can be further reduced. Each row line pair Al or A2 is operated by the normal interlaced scanning signal regardless of the field. This is because the odd-numbered field scanning signal is first applied to the first control line G1 to switch both the first and second rows on and is then applied to the second control line G2 during the next succeeding scanning to switch both the third and fourth rows on and because the even-numbered scanning signal is first applied to the first control line G1 to switch both the second and first rows on and is then applied to the second control line G2 to switch both the fourth and third rows on.

It is to be noted that the concept of the present invention which has been described as applied to the NTSC system can be equally applicable to the PAL system.

As fully described above, the frequency of 30 Hz can be employed as the drive frequency for the liquid crystal cells and, accordingly, no flicker will substantially occur in the picture being reproduced. Also, since during any field each two line rows are simultaneously operated by the odd- and even-numbered field signals, all of the effective scanning lines can be used for each field and, accordingly, the resolution in the vertical direction can be considerably improved. Moreover, the structure may employ the usual interlaced scanning and the usual scanning speed, and no high speed characteristic is required in data transmission.

An active matrix type liquid crystal display device according to a second preferred embodiment of the present invention will now be described with reference to FIGS. 6 to 10.

Figure 6:
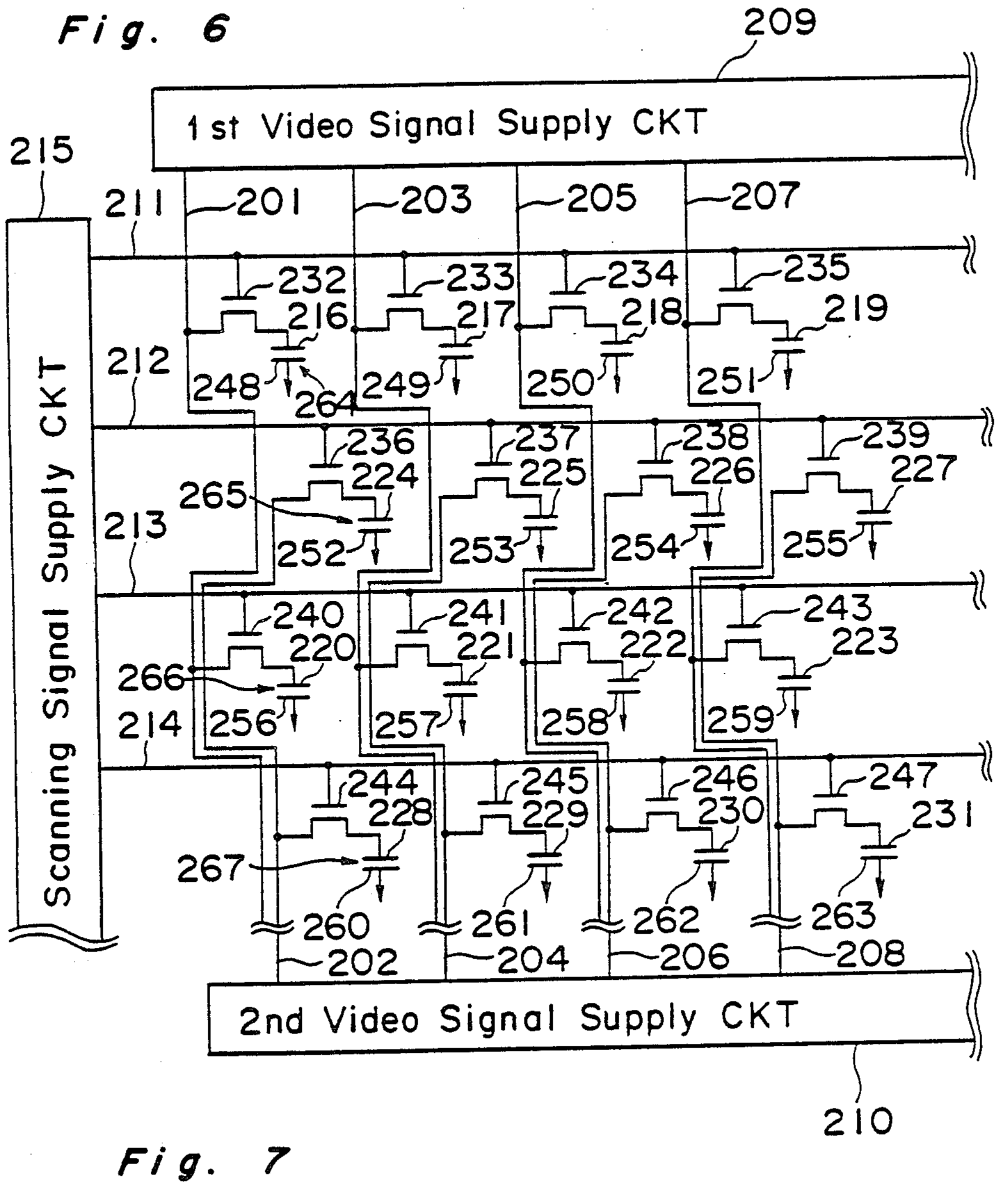
FIG. 6 is an equivalent circuit diagram of a liquid crystal display device of active matrix type according to a second preferred embodiment of the present invention.

Referring first to FIG. 6, reference numerals 201, 203, 205 and 207 represent respective first video signal lines; reference numerals 202, 204, 206 and 208 represent respective second video signal lines; reference numeral 209 represents a first video signal supply circuit; reference numeral 210 represents a second video signal supply circuit; and reference numeral 215 represents a scanning signal circuit. Reference numerals 216 to 223 represent first picture element electrodes to which the first video signals are applied, respectively; reference numerals 224 to 231 represent second picture element electrodes to which the second video signals are applied, respectively; and reference numerals 232 to 247 represent respective thin film transistors.

Reference numerals 148 to 163 represent counter electrodes disposed in a face-to-face relationship with the first and second picture element electrodes 216 to 223 and 224 to 231, all of the counter electrodes being connected together. Reference numerals 264 and 266 represent first and second liquid crystal cells corresponding to the first picture element electrodes 216 and 220, respectively, and reference numerals 265 and 267 represent third and fourth liquid crystal cells corresponding to the second picture element electrodes 224 and 228.

The first video signals from the first video signal supply circuit 209 are supplied to the first picture element electrodes 216 to 219 through the thin film transistors 232 to 235, respectively, and also to the first picture element electrodes 220 to 223 through the thin film transistors 240 to 243, respectively, whereas the second video signals from the second video signal supply circuit 210 are supplied to the second picture element electrodes 224 to 227 through the thin film transistors 236 to 239, respectively, and also to the second picture element electrodes 228 to 231 through the thin film transistors 244 to 247, respectively.

While the interlaced scanning is effected in order to display a picture, the sequence of the scanning is such that, during each odd-numbered field, the scanning signals are outputted from the scanning signal supply circuit 215 to the scanning lines 211 and 212 to cause the respective gates of the thin film transistors 232 to 239 to conduct which in turn causes the first video signals to be applied to the first picture element electrodes 216 to 219 and the second video signals to the second picture element electrodes 224 to 227. The scanning signals are subsequently outputted from the scanning signal supply circuit 215 to the scanning lines 213 and 214 to cause the respective gates of the thin film transistors 240 to 247 to conduct which in turn causes the first video signals to be applied to the first picture element electrodes 220 to 223 and the second video signals to the second picture element electrodes 228 to 231. Thereafter, the scanning takes place in a manner similar to that described above. During the subsequent even-numbered field, however, the first and second video signals are supplied to the first and second picture element electrodes 216 to 231 in a manner similar to the first video signals as described above, thereby completing the scanning during the odd- and even-numbered fields.

Figure 7:
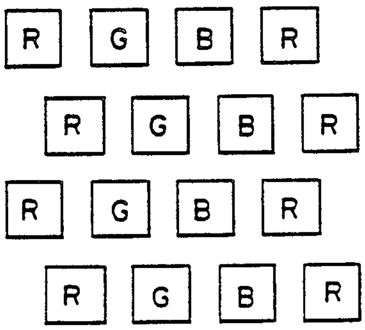
FIG. 7 is a schematic diagram showing an arrangement of picture elements corresponding to the arrangement of electrodes in the liquid crystal display device of FIG. 6.

FIG. 7 illustrates the picture element electrodes arranged in correspondence with the arrangement of the picture elements.

In FIG. 7, reference characters R, G and B represents the three additive primary colors, that is, red, green, and blue, wherein the picture elements in each odd-numbered line are displaced a half-cycle period ($\frac{1}{2}$ pitch) relative to the picture elements in each even-numbered line.

Figure 8:
FIG. 8 is a chart showing respective waveforms of signals contained in the NTSC television signal which is used in the practice a of the liquid crystal display device.

FIG. 8 illustrates an example wherein the composite video signal used in the NTSC television system is applied to the liquid crystal display device. In FIG. 8, a waveform (a) represents a vertical synchronizing signal; a waveform (b) represents a horizontal synchronizing signal; a waveform (c) represents a composite video signal; and a waveform (d) represents sampling pulses. Left-hand and right-hand portions of the vertical synchronizing signal (a) correspond respectively to the odd- and even-numbered fields and, during each of the odd- and even-numbered field, the scanning signals are successively outputted in synchronism with the horizontal synchronizing signal (b). Sampling pulses (d) shown in FIG. 8 are a signal used to determine how often the composite video signal should be sampled during each horizontal scanning period. The sampling pulses have a frequency whose determination is dependent upon the number of the picture elements in the horizontal direction, that is, the number of the picture element electrodes in the horizontal direction. The video signals for driving the liquid crystal cells are supplied to the respective liquid crystal cells in dependence on the video signals so sampled.

Figure 9:
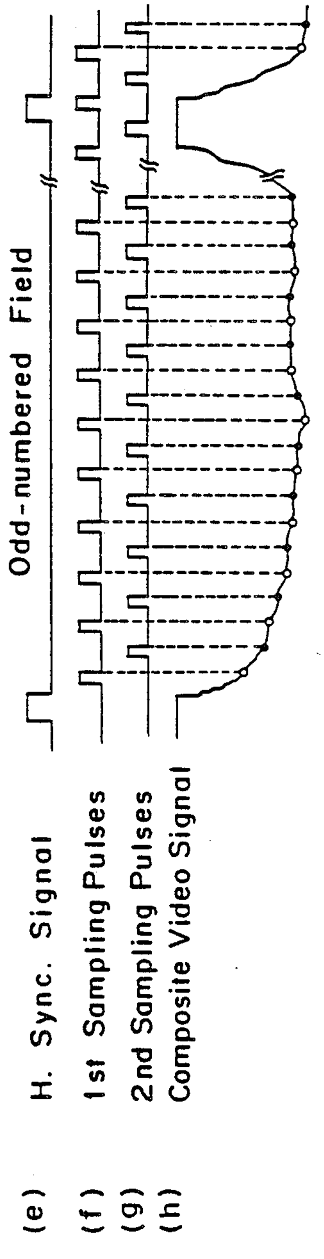
FIG. 9 is a chart showing respective waveforms of signals contained in the NTSC television signal which is used in the practice of the liquid crystal display device of the present invention.

FIG. 9 illustrates an example wherein the composite video signal used in the NTSC television system is applied to the liquid crystal display device of the present invention. In FIG. 9, waveform (e) represents a horizontal synchronizing signal during each odd-numbered field; waveform (f) represents first sampling pulses; waveform (g) represents second sampling pulses; and waveform (h) represents a composite video signal.

The composite synchronizing signal (h) shown in FIG. 9 is identical with the composite synchronizing signal (c) shown in FIG. 8 and is sampled by the first and second sampling pulses (f) and (g), wherein the first sampling pulses (f) are sampling pulses for the first video signal which is applied to the first picture element electrodes 216 to 223 corresponding to the scanning lines 211 and 213 for each odd-numbered row whereas the second sampling pulses (g) are sampling pulses for the second video signal which is applied to the second picture element electrodes 224 to 231 corresponding to the scanning lines 212 and 214 for each even-numbered row. The first and second sampling pulses (f) and (g) are displaced a half-cycle period in phase relative to each other such that an intermediate point between points sampled by the first sampling pulses can be sampled by the second sampling pulses.

While utilizing the usual line interlaced scanning procedures the scanning lines 211 and 213 in each odd-numbered row and the scanning lines 212 and 214 in each even-numbered row are scanned during the odd- and even-numbered fields, respectively. In the liquid crystal display device embodying the present invention the odd-numbered scanning line 211 and the next adjacent even-numbered scanning line 212 are paired for scanning and the subsequent odd-numbered scanning line 213 and the next adjacent even-numbered scanning line 214 are paired for scanning. Accordingly, the composite video signal (h) shown in FIG. 9 is the one for the odd-numbered field and, although it does not contain the signal for the even-numbered field, the intermediate point between the points for the odd-numbered fields which have been sampled are compensated for by an interpolation method so that the second video signal can be obtained by sampling the intermediate point.

Figure 10:
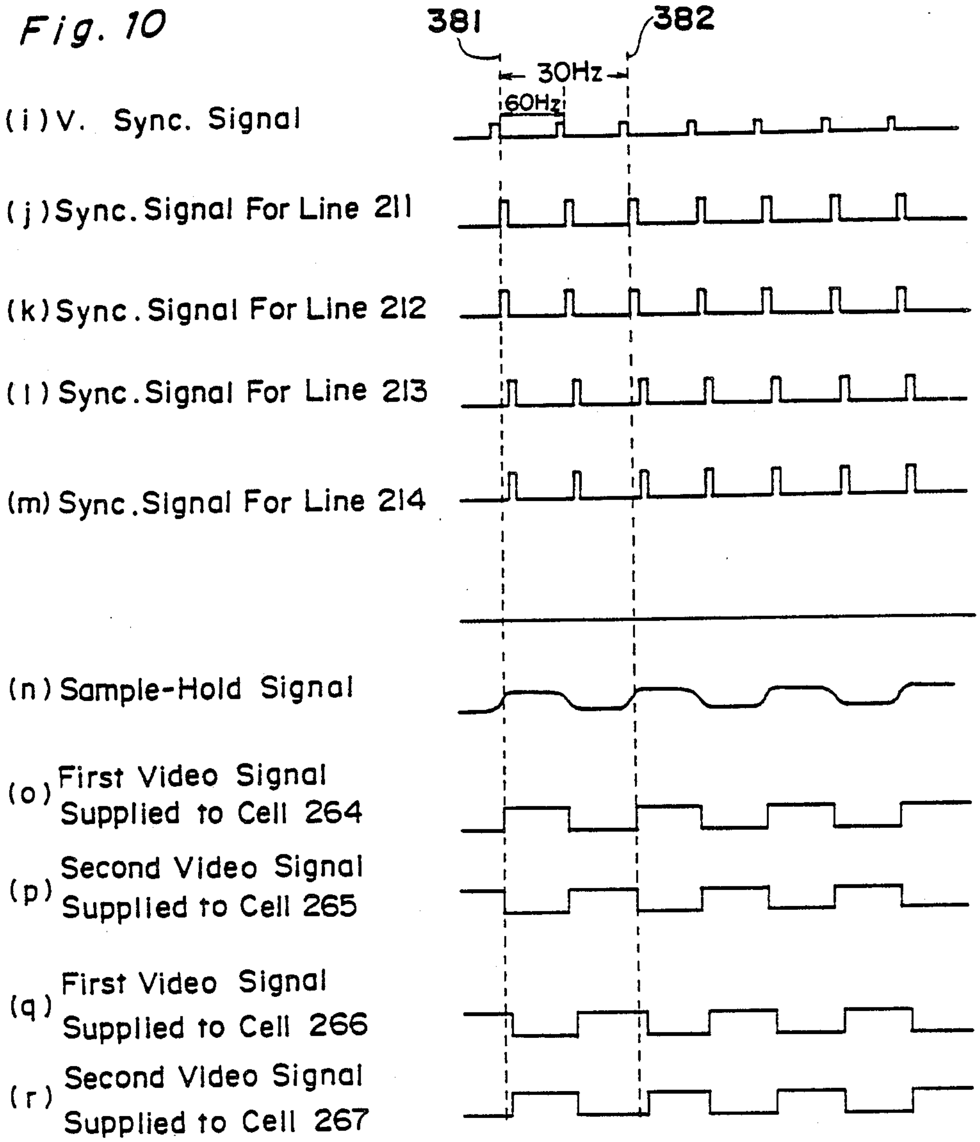
FIG. 10 is a timing chart showing the sequence of operation of first to fourth liquid crystal cells during the interlaced scanning in the device of FIG. 6.

FIG. 10 illustrates a timing chart showing the operation of the first, second, third and fourth liquid crystal cells 264, 265, 266 and 267 during the interlaced scanning.

Waveform (i) represents a vertical synchronizing signal during each of the odd- and even-numbered field for the image reproduction having a frequency of 60 Hz wherein one picture, that is, one frame, is comprised of 30 Hz between points 381 and 382.

Waveforms (j) and (k) represent respective scan synchronizing signals for the scanning lines 211 and 212, and waveforms (l) and (m) represent respective scan synchronizing signals for the scanning lines 213 and 214.

Waveform (n) represents an example of an analog sample-hold signal corresponding to a video signal voltage supplied to the first liquid crystal cell 264 and outputted from the first video signal supply circuit 209.

Waveforms (o) to (r) illustrate respective models of analog sample-hold signals similar to the analog sample-hold signal (n), wherein the waveform (o) represents the polarity of the first video signal supplied to the first liquid crystal cell 264; the waveform (p) represents the polarity of the second video signal supplied to the second liquid crystal cell 265; the waveform (q) represents the polarity of the first video signal supplied to the third liquid crystal cell 266; and the waveform (r) represents the polarity of the second video signal supplied to the second liquid crystal cell 267.

As shown in FIG. 10, during each of the odd- and even-numbered fields, the first and second video signals (o) and (p) are outputted from the first and second video signal supply circuits 209 and 210 in synchronism with the scan synchronizing signals (j) and (b) for the scanning lines 211 and 212, respectively, and, subsequently, the first and second video signals (q) and (r), which are the first and second video signals (o) and (p) having been reversed in polarity, respectively, are outputted from the first and second video signal supply circuits 209 and 210 in synchronism with the scan synchronizing signals (l) and (k) for the scanning lines 213 and 214, respectively.

At this time, the first video signal has a phase displacement of 180°, that is, a half-cycle period, relative to the second video signal.

Although in FIG. 10 only the first, second, third and fourth liquid crystal cells 264, 265, 266 and 267 are illustrated, the row of the first picture element electrodes corresponding to the first liquid crystal cell 264 has the same polarity as the row of the second picture element electrodes corresponding to the second liquid crystal cell 265, and the row of the first picture element electrodes corresponding to the third liquid crystal cell 266 has the same polarity as the row of the fourth picture element electrodes corresponding to the fourth liquid crystal cell 267.

Accordingly, since the difference between the analog data signals of the neighboring odd- and even-numbered fields is small and since the arrangement of the picture element electrode is such that the first picture element electrodes are displaced by a half-cycle period from the second picture element electrodes in a direction conforming to the scanning direction, a spectrum of an average light response of a liquid crystal panel will become half the field frequency, that is, 30 Hz and, accordingly, not only will any possible reduction of the resolution be avoided, but also no use of the memory of relatively large memory capacity and the high speed clock frequency is required. Therefore, a picture with no flicker can be reproduced.

Even the embodiment shown in and described with reference to FIGS. 6 to 10 can be equally applicable not only to the NTSC television system, but also to the PAL television system wherein the frequency of 50 Hz is used.

As described above, the second preferred embodiment of the present invention effectively to provides a liquid crystal display device which does not require the use of the memory of relatively large memory capacity and of the high speed clock frequency and which is substantially free from any possible reduction in resolution and also any possible occurrence of flickers.

FIGS. 11 to 15 illustrate a third preferred embodiment of the present invention, reference to which will now be made.

Figure 11:
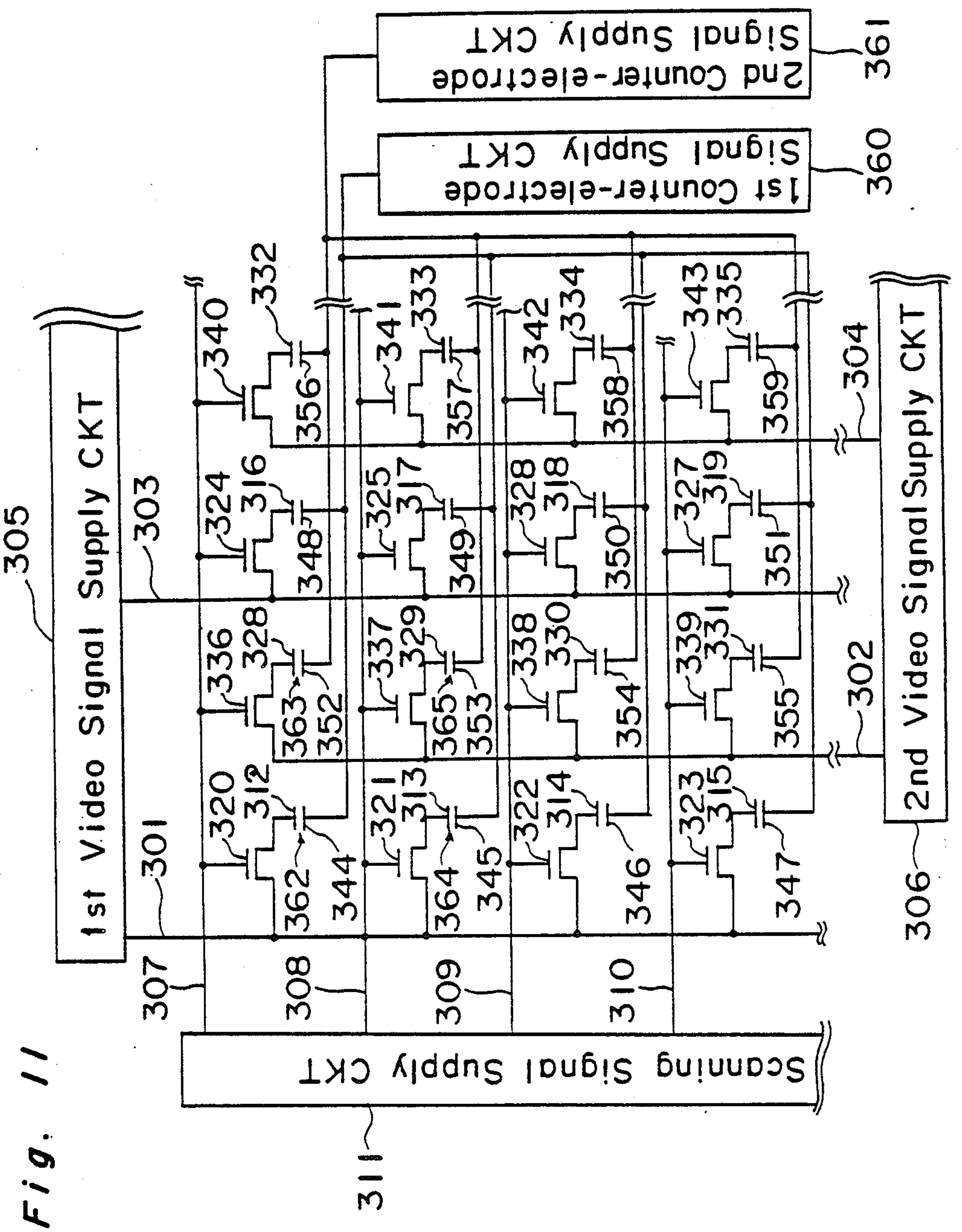
FIG. 11 is an equivalent circuit diagram of a liquid crystal display device of active matrix type according to a third preferred embodiment of the present invention.

In FIG. 11, reference numerals 301 and 303 represent respective first video signal lines; reference numerals 202 and 204 represent respective second video signal lines; reference numeral 205 represents a first video signal supply circuit; reference numeral 206 represents a second video signal supply circuit; reference numerals 307 to 310 represent respective scanning lines; and reference numeral 311 represents a scanning signal supply circuit. Reference numerals 312 to 319 represent respective first picture element electrodes to which the first video signals are applied, respectively; reference numerals 328 to 335 represent second picture element electrodes to which the second video signals are applied, respectively; and reference numerals 320 to 327 represent respective thin film transistors connected to the first video signal lines 301 and 303, and reference numerals 336 to 343 represent respective thin film transistors connected to the second video signal lines 302 and 304.

Reference numerals 344 to 351 represent counter electrodes disposed in a face-to-face relationship with the first picture element electrodes 312 to 319, respectively; reference numerals 352 to 359 represent counter electrodes disposed in a face-to-face relationship with the second picture element electrodes 328 to 335 and 224 to 231; reference numeral 360 represents a first counter electrode signal supply circuit; reference numeral 361 represents a second counter electrode signal supply circuit; and reference numerals 362, 363, 364 and 365 represent respective first, second, third and fourth liquid crystal cells corresponding to the first picture element electrode 313, the second picture element electrode 328, the first picture element electrode 313 and the second picture element electrode 329.

The first video signals from the first video signal supply circuit 305 are supplied to the first picture element electrodes 312 to 319 through the thin film transistors 320 to 327, respectively, whereas the second video signals from the second video signal supply circuit 206 are supplied to the second picture element electrodes 328 to 335 through the thin film transistors 336 to 343, respectively. While the interlaced scanning is utilized in order to display a picture, the sequence of the scanning is such that, during each odd-numbered field, the scanning signals are outputted from the scanning signal supply circuit 311 to the odd-numbered scanning lines 307 and 309 to cause the respective gates of the thin film transistors 320, 336, 324 and 340 to conduct which in turn causes the first video signals to be applied to the first picture element electrodes 312 and 316 and the second video signals to the second picture element electrodes 328 and 332, followed by conduction of the respective gates of the thin film transistors 322, 338, 326 and 342 to apply the first video signals to the first picture element electrodes 314 and 318 and the second video signals to the second picture element electrodes 330 and 334. Thereafter, during the subsequent even-numbered field, the scanning signals are outputted from the scanning signal supply circuit 311 to the even-numbered scanning lines 308 and 310 to cause the respective conduct which in turn causes the first video signals to be applied to the first conduct to apply the first video signals to the first picture element electrodes 313 and 317 and the second video signals to the second picture element electrodes 329 and 333, followed by conduction of the respective gates of the thin film transistors 323, 339, 327 and 343 to apply the first video signals to the first picture element electrodes 315 and 319 and the second video signals to the second picture element electrodes 331 and 335.

Figure 12:
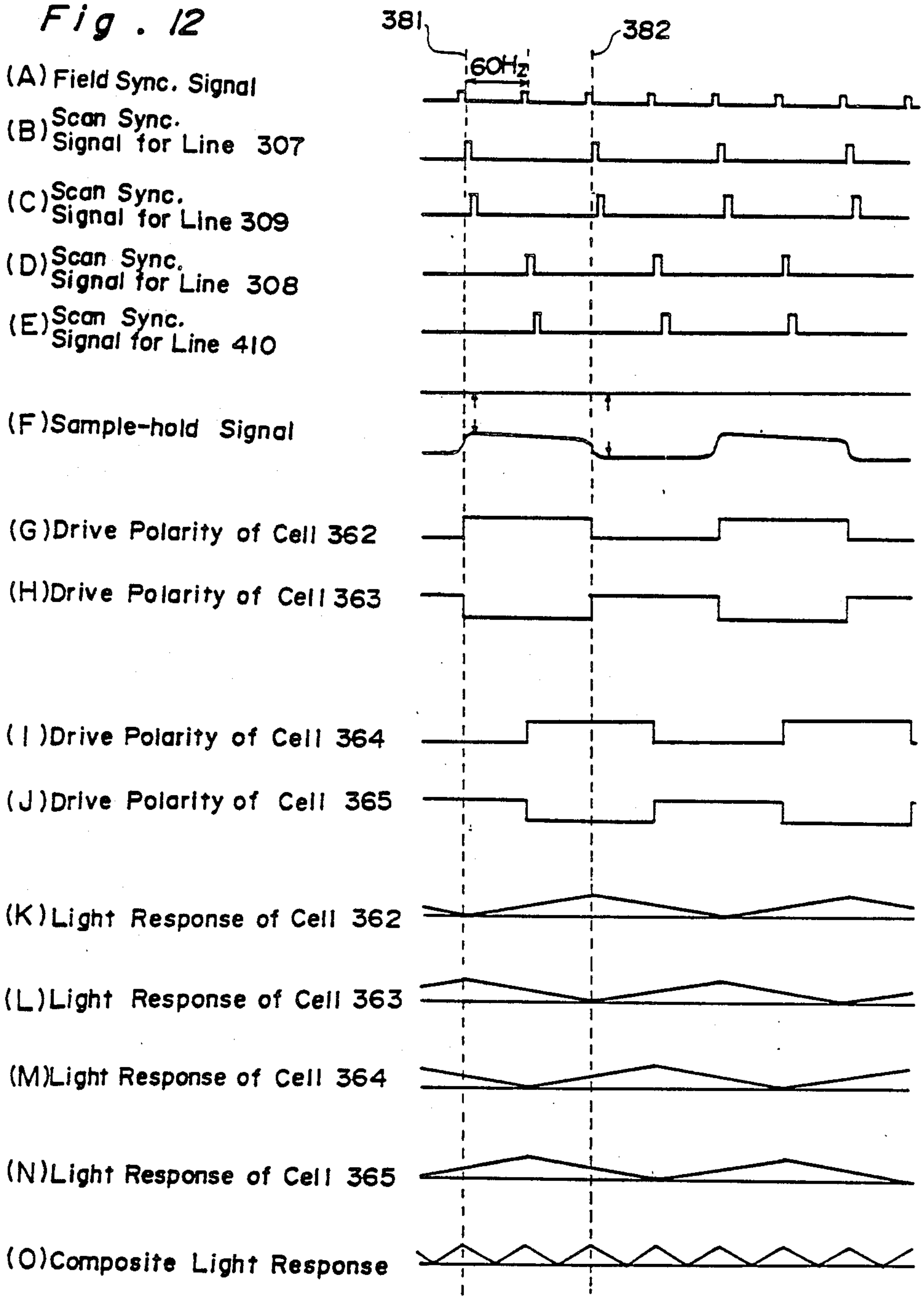
FIG. 12 is a timing chart showing the sequence of operation of first through fourth liquid crystal cells during the interlaced scanning in the device of FIG. 11.

FIG. 12 illustrates a timing chart showing the operation of the first, second, third and fourth liquid crystal cells during the interlaced scanning.

Waveform (A) represents a vertical synchronizing signal during each of the odd- and even-numbered field for he image reproduction having a frequency of 60 Hz wherein one picture, that is, one frame, is comprised of 30 Hz between points 381 and 382. Waveforms (B) and (C) represent respective scan synchronizing signals for the scanning lines 307 and 309 during the odd-numbered fields, and waveforms (D) and (E) represent respective scan synchronizing signals for the scanning lines 308 and 310 during the even-numbered fields. Waveform (F) represents an analog sample-hold signal corresponding to a video signal voltage supplied to the first picture element electrode 312 and outputted from the first video signal supply circuit 305, the value of which varies between the voltages 1V1 and V2.

Waveforms (G) to (J) illustrate respective models of analog sample-hold signals similar to the analog sample-hold signal (F), representing the polarities of the first and second video signals supplied to the first and second picture element electrodes 312, 313 and 328, 329, wherein the waveform (G) represents the polarity of the first liquid crystal cell 362, the waveform (H) represents the polarity of the second liquid crystal cell 363, the waveform (I) represents the polarity of the third liquid crystal cell 364 and the waveform (J) represents the polarity of the fourth liquid crystal cell 364.

Waveforms (K) to (N) represent light responses of the first to fourth liquid crystal cells 362, 363, 364 and 365 corresponding to the signals (G) to (J), respectively.

As shown in FIG. 12, during each odd-numbered field, the first and second video signals (G) and (H) are outputted from the first and second video signal supply circuits 305 and 306 in synchronism with the scan synchronizing signals (B) on the scanning lines 307, respectively, and, subsequently, during each even-numbered field, the first and second video signals (I) and (J), which are delayed 90° in phase, that is, $\frac{1}{4}$ cycle, relative to the similar signals during the odd-numbered field, are outputted from the first and second video signal supply circuits 305 and 306 in synchronism with the scan synchronizing signals (D) on the scanning lines 213 and 214, respectively. At this time, the signal (H) of drive polarity for the second liquid crystal cell 363 has a phase displacement of 180°, that is, a half-cycle period, relative to the signal (G) of drive polarity for the adjacent first liquid crystal cell 362. Similarly, the signal (J) of drive polarity for the fourth liquid crystal cell 365 has a phase displacement of 180°, that is, a half-cycle period, relative to the signal (I) of drive polarity for the third liquid crystal cell 364. Waveform (O) represents a composite light response formed by combining the light responses (K) to (N), and, when the first to fourth liquid crystal cells 362 to 365 are considered as forming a single block, the light response will be 60 Hz, illustrating that the occurrence of the flicker can be eliminated by this method.

Figure 13:
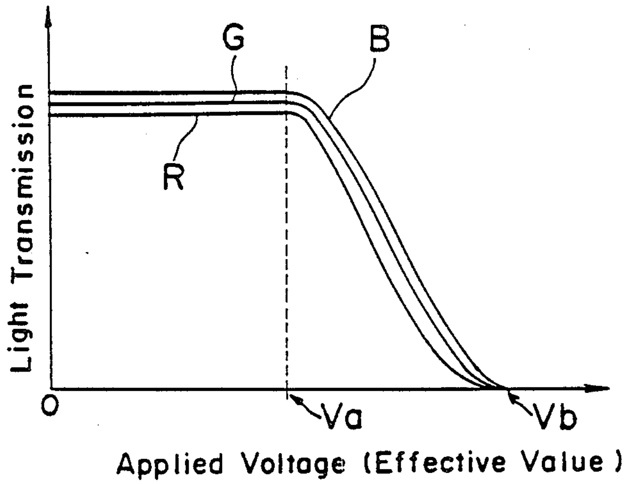
FIG. 13 is a graph showing the relationship between the light transmission and the voltage applied to liquid crystal cells having a normal white characteristic used in the embodiment of FIG. 11.

FIG. 13 illustrates a graph showing one example of the relationship between the light transmission and the applied voltage (effective value) of the liquid crystal cell having a normal white characteristic used in the illustrated embodiment.

In FIG. 13, R, G and B indicate different wavelengths, wherein R represents a red light (632 nm), G represents a green, light (520 nm), and B represents a blue light (488 nm). The light transmission of the liquid crystal cell is high when the applied voltage V is zero, resulting in a bright color display. If the applied voltage V is increased, the light transmission starts decreasing at a threshold voltage value Va and attains a minimum value when the applied voltage attains a value Vb, resulting in a dark color display.

Figure 14:
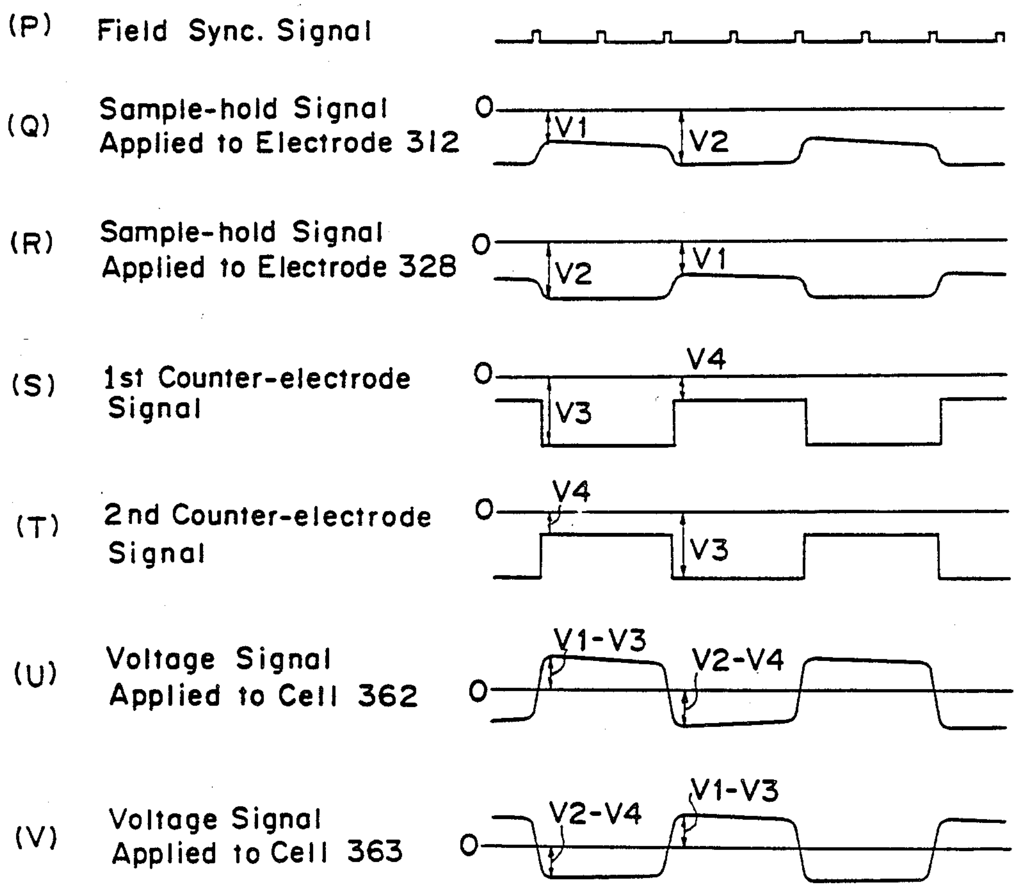
FIG. 14 is a timing chart showing voltage signals applied to the neighboring first and second liquid crystal cells when a dark display is effected with the use of the liquid crystal cells having the normal white characteristic.

FIG. 14 is a timing chart showing the voltage signals applied to the neighboring first and second liquid crystal cells 362 and 362 when a dark color display is desired with the use of the liquid crystal cell having a normal white characteristic, wherein in order to apply the voltage corresponding to a threshold value to these liquid crystal cells first and second counter electrode signals are respectively applied to the first and second counter electrodes 344 and 352.

In FIG. 14, a waveform (P) represents an odd- or even-numbered field synchronizing signal for the picture display which is similar to the signal (A) shown in FIG. 12. Waveform (Q) represents a signal identical with the signal (F) shown in FIG. 12, i.e., analog sample-hold signal corresponding to the video signal voltage supplied to the first picture element electrode 312 and outputted from the first video signal supply circuit 305, the voltage of which varies between values V1 and V2. A waveform (R) represents an analog sample-hold signal supplied to the second picture element electrode 328 and outputted from the second video signal supply circuit 306, the signal (R) having a phase displacement of a half-cycle period relative to the signal (Q). Waveforms (S) and (T) represent a bias voltage of the first counter electrode signal supplied to the first counter electrode 344 and a bias voltage of the second counter electrode signal supplied to the second counter electrode 352, respectively, the value of which each voltage varies between a low level of a voltage V3 and a high level of a voltage V4. The signal (T) has a phase displacement of a half-cycle period relative to the signal (S). Waveforms (U) and (V) represent signals of voltages being applied to the first and second liquid crystal cells 362 and 363, respectively.

In the neighboring first and second liquid crystal cells 362 and 363, the scanning line 307 is scanned and, when the respective gates of the thin film transistors 320 and 336 are brought into their conductive state, the signals (Q) and (R) are supplied through the first and second video signal lines 301 and 302, respectively. Since at this time the signals (S) and (T) which are the bias voltages are applied to the first and second counter electrodes 344 and 352, respectively, the signal (U) of the voltage applied to the first liquid crystal cell 362 becomes the difference between the signal (Q) and the signal (S) while the signal (V) of the voltage applied to the second liquid crystal cell 363 will become the difference between the signal (R) and the signal (T), and as a result the signals (U) and (V) are respectively applied to the first and second liquid crystal cells 362 and 363, varying in amplitude between the maximum value (V1–V3) and the minimum value (V2–V4). Also, the signal (V) of the voltage applied to the second liquid crystal cell 363 has a phase displacement of a half-cycle period relative to the signal (U) of the voltage applied to the adjacent first liquid crystal cell 362.

Figure 15:
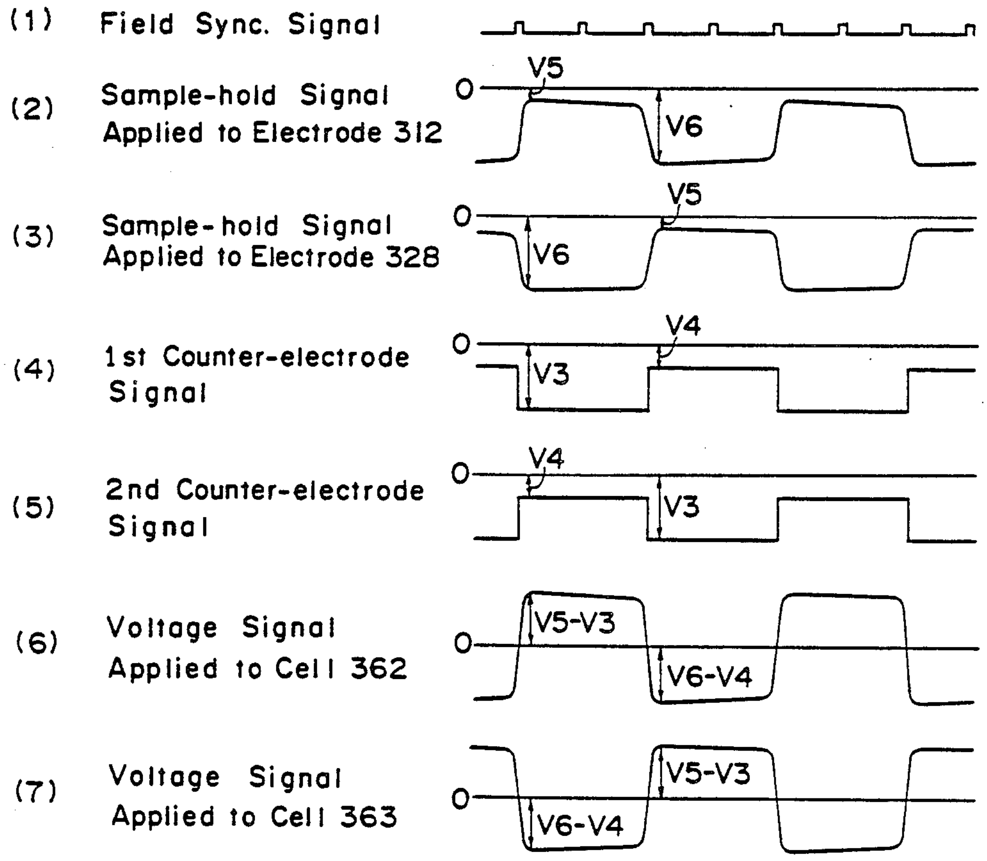
FIG. 15 is a timing chart showing voltage signals applied to the neighboring first and second liquid crystal cells when a bright display is effected with the use of the liquid crystal cells having the normal white characteristic.

FIG. 15 is a timing chart similar to FIG. 14, which is applicable when a bright color display is desired with the use of the liquid crystal cell having a normal white characteristic.

Referring to FIG. 15, waveform (1) is similar to the waveform (P) in FIG. 14 and represents an odd- or even-numbered field synchronizing signal for the picture display. Waveform (2) is similar to a waveform (Q) in FIG. 14 and represents an analog sample-hold signal corresponding to the video signal voltage supplied to the first picture element electrode 312 and outputted from the first video signal supply circuit 5, the voltage of which varies between values V5 and V6 for the bright color display. Waveform (3) represents an analog sample-hold signal supplied to the second picture element electrode 328 and outputted from the second video signal supply circuit 306, the signal (3) having a phase displacement a half-cycle period relative to the signal (2). Waveforms (4) and (5) represent a bias voltage of the first counter electrode signal supplied to the first counter electrode and a bias voltage of the second counter electrode signal supplied to the second counter electrode, respectively, which signals are identical with the signals (S) and (T) shown in FIG. 14. Waveforms (6) and (7) represent signals of voltages being applied to the first and second liquid crystal cells 362 and 363, respectively.

The signal supply system is identical with that shown in FIG. 14 and, since the bias voltage signals (4) and (5) are supplied to the first and second counter electrodes 344 and 352, respectively, the signal (6) of the voltage applied to the first liquid crystal cell 362 is equal to the difference between the signal (2) and the signal (4) whereas the signal (7) of the voltage applied to the second liquid crystal cell 363 is equal to the difference between the signal (3) and the signal (5) wherefore the signals (6) and (7) are applied to the first and second liquid crystal cells 362 and 363, respectively, with the consequence that their amplitude aries between (V5–V3) to (V6–V4). The signal (7) of the voltage applied to the second liquid crystal cell 362 has a phase displacement of a half-cycle period relative to the signal (6) of the voltage applied to the adjacent liquid crystal cell 362.

While reference has been made only to the signals of the voltages applied respectively to the first and second liquid crystal cells 362 and 363, a similar description applies to all of the rows of the first liquid crystal cells to which the first video signal is supplied from the first video signal supply circuit 305 and also to all of the rows of the second liquid crystal cells to which the second video signal is supplied from the second video signal supply circuit 306. Specifically, since the video signals having a phase displacement of a half-cycle period relative to each other are supplied to the neighboring liquid crystal cells and since the first and second counter electrode signals displaced a half-cycle period in phase relative to each other are supplied to the row of the first counter electrodes confronting the first picture element electrodes in the rows of the first liquid crystal cells and the row of the second counter electrodes confronting the second picture element electrodes in the rows of the second liquid crystal cells, the neighboring liquid crystal cell rows can be driven by the application of the voltages having a phase displacement of a half-cycle period from each other.

As described above, where the neighboring liquid crystal cells are driven according to a drive method of the present invention wherein the counter electrodes are divided into the first and second counter electrodes having phase displacement of a half-cycle period from each other, the applied voltage V of the video signal such as shown in FIG. 13 can be oscillated between the voltage value Va and the voltage value Vb with the consequence that the applied voltage V can approach the voltage value Vb satisfactorily, thereby to accomplishing a high contrast picture reproduction without flickers being accompanied.

A similar effect as described above can also be obtained even when the liquid crystal cells having a normal black characteristic are employed, although reference has been made to the liquid crystal cells having a normal white characteristic. Also, even the embodiment shown in and described with reference to FIGS. 11 to 15 can be applicable to the PAL television system.

According to the third preferred embodiment of the present invention which has been described above, it is possible to apply the bias voltages to the counter electrodes in correspondence with the polarities of the video signals which are reversed relative to each other for each of the liquid crystal cells of the odd- and even-numbered lines of the video signal, and therefore, an active matrix-type liquid crystal display device substantially free from the occurrence of flickers can be obtained.

Figure 16:
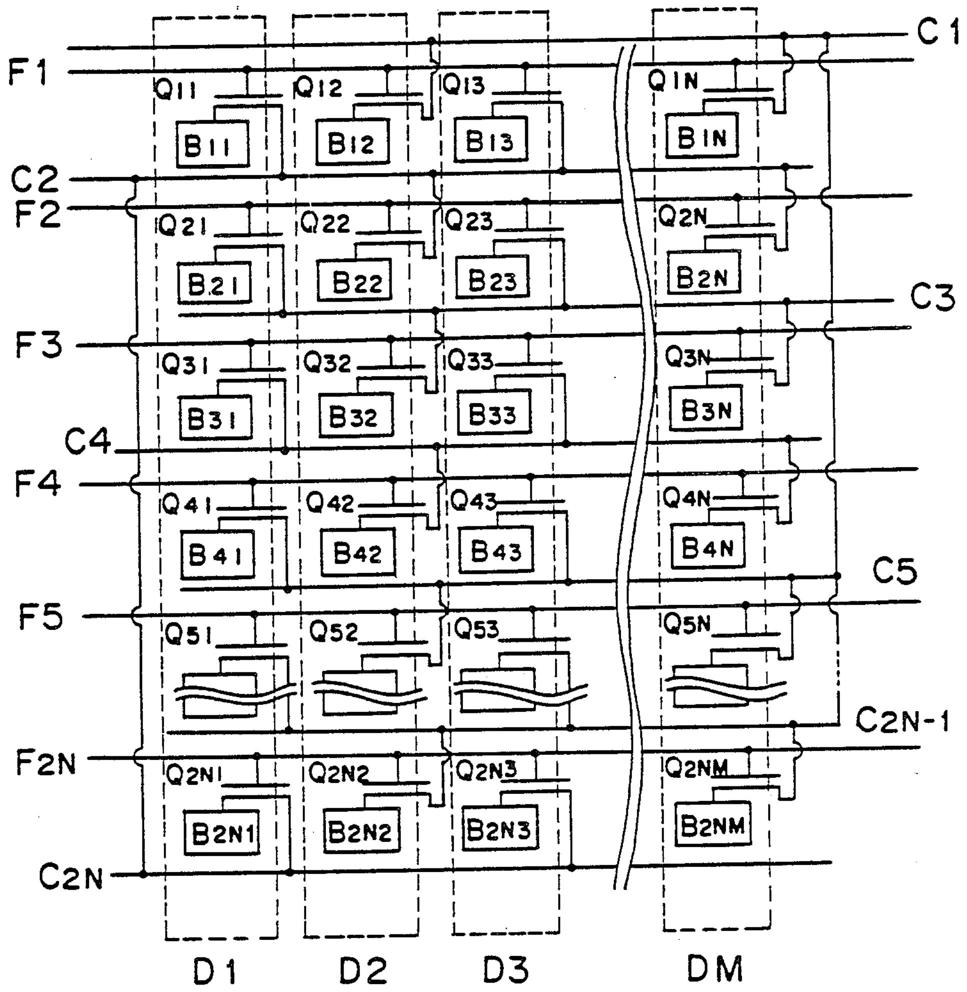
FIG. 16 is an equivalent circuit diagram of a liquid crystal display device of active matrix type according to a fourth preferred embodiment of the present invention.
Figure 17:
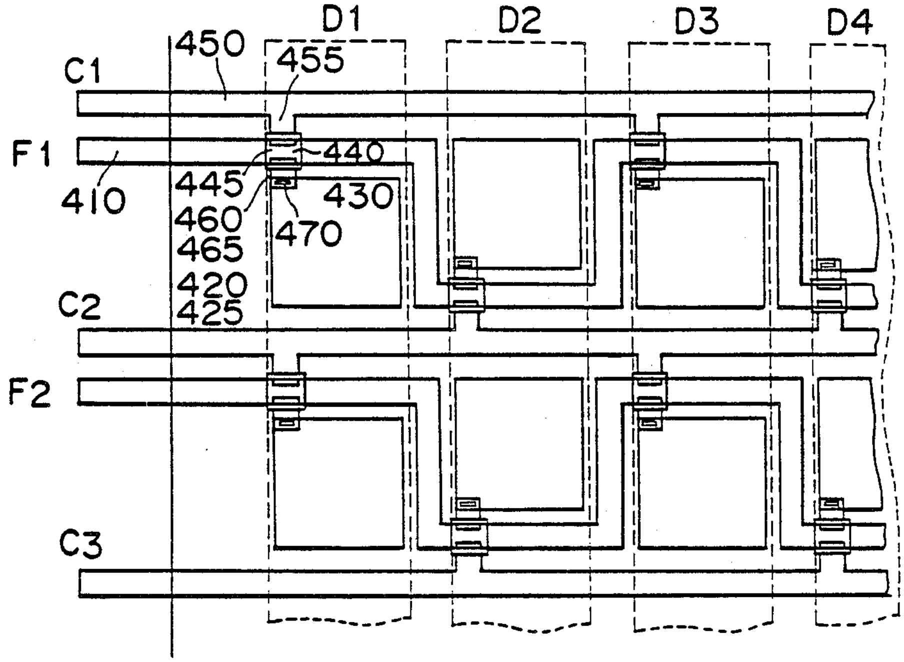
FIG. 17 is a schematic diagram used to explain a process of manufacture of the liquid crystal device of FIG. 16.
Figure 19:
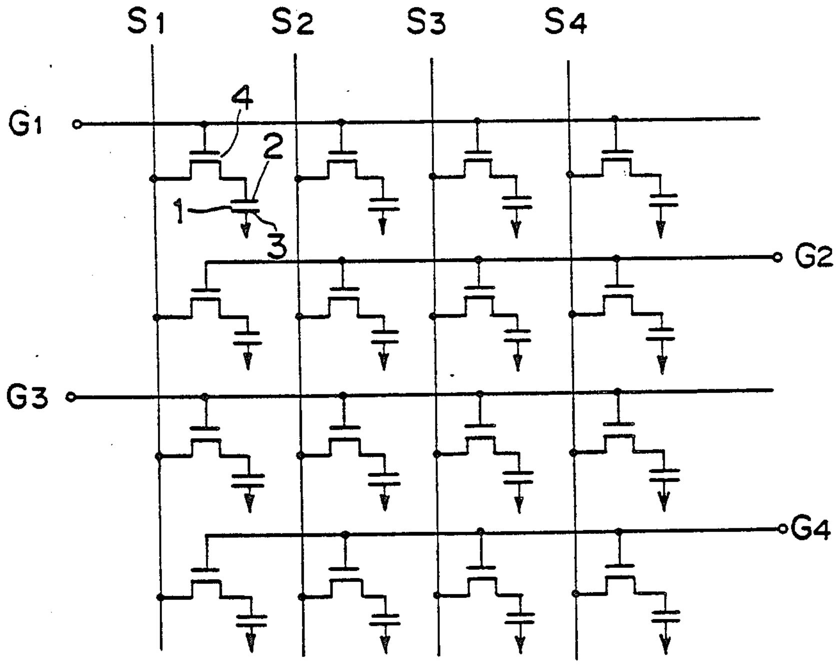
Fig. 19 Prior Art
FIG. 19 is an equivalent circuit diagram of the prior art liquid crystal display device.

FIGS. 16 to 18 illustrate a fourth preferred embodiment of the present invention, reference to which will now be made.

Referring first to FIG. 16, Q11, Q12, . . . Q2NM represent respective TFTs having their gates connected with gate bus electrodes F1, F2, . . . FNM. For each gate bus electrode F1, F2, . . . FNM, a pair of common line electrodes is provided. So far illustrated, the odd-numbered common line electrodes C1, C3, . . . C2N-1 and the even-numbered common line electrodes C2, C4, . . . C2N are classified in different groups. While the common line electrodes of each group are connected together and are applied with an identical voltage, the voltage applied to one group of the common line electrodes has a polarity opposite to that of the voltage applied to the other group of the common line electrodes. Accordingly, when a positive voltage is applied to the odd-numbered common line electrodes C1, C3, . . . C2N-1, a negative voltage is applied to the even-numbered common line electrodes C2, C4, . . . C2N. This condition is maintained during one frame, but is reversed during the subsequent second frame so that the negative and positive voltages can be supplied to the odd-numbered and even-numbered common line electrodes C1, C3, . . . C2N−1 and C2, C4, . . . C2N, alternatively. This is repeated for each frame. Ones of source and drain electrodes of TFTs in each row are connected to picture element electrodes B11, B12, . . . B2NM whereas the others of the source and drain electrodes of TFTs in each row are alternately connected to the paired common line electrodes C1 and C2, C3 and C4, . . . C2N−1 and C2N which are positioned on respective sides of the gate bus electrodes F1, F2, . . . F2N.

The TFTs Tll, T12, . . . T2NM, the gate bus electrodes F1, F2, . . . F2N, the common line electrodes C1, C2, C2N and the picture element electrodes Bll, B12, B2NM are all formed on an insulating substrate, for example, a glass plate, and data bus electrodes D1, D2, . . . DM which serve as respective counter electrodes as indicated by phantom lines in FIG. 16 are formed on an inner surface of another insulating substrate positioned in a face-to-face relationship with such insulating substrate with a liquid crystal layer (not shown) intervening between then. It is to be noted that a voltage applied to the data bus electrodes alternates in polarity in such a manner that the voltage has a positive polarity when applied to the odd-numbered data bus electrodes D1, D3 and so on while it has a negative polarity when applied to the even-numbered data bus electrodes D2, D4 and so on. This alternation of the voltage takes place for each frame as is the case with the reversing of the voltage applied to the common line electrodes.

The electrodes of the TFTs T11, T12, T2NM which are connected to the picture element electrodes B11, B12, . . . B2NM may be either their drains or sources thereof, and similarly, the electrodes whioh are connected to the common line electrodes may be either sources or drains.

In this fourth preferred embodiment of the present invention, since the interlaced scanning in which the video signal has each frame divided into two fields where a televised picture is to be displayed, a data signal voltage is, during the interlaced scanning, sequentially written in first, third, . . . 2N-1th rows of liquid crystal cells each formed by the associated picture element electrode B11, B12, B2NM, the associated data bus electrode D1, D2, . . . DM and the liquid crystal layer, and then in second, fourth, . . . 2Nth rows of the liquid crystal cells. In the active matrix type liquid crystal display device according to the embodiment now being discussed, the scanning signal is sequentially applied to the first, third, . . . 2N-1th rows, and at the same time, positive and negative bias voltages are alternately applied to the odd- and even-numbered common line electrodes C1, C2, C3, C4, . . .C2N−1 and C2N for one frame (two-field) period. On the other hand, negative and positive data signal voltages are alternately applied to the odd- and even-numbered data bus electrodes D1, D2, . . .DM in an amplitude corresponding to contents to be displayed. As a result, during the first field F1, voltages of polarities such as shown in blocks Ba and Bd in FIG. 18 are applied to the picture element electrodes and the data bus electrodes. It is, however, to be noted that in FIG. 18 only picture elements in the first to fourth column for the first to fourth rows are illustrated.

During the second field F2, the scanning signal is sequentially applied to the second, fourth, . . . 2Nth rows, and at the same time, positive and negative bias voltages are alternately applied to the odd- and even-numbered common line electrodes. On the other hand, positive and negative data signal voltages are alternately applied to the odd- and even-numbered data bus electrodes in an amplitude corresponding to contents to be displayed. Therefore, voltages of polarities such as shown in blocks Bf and Bh in FIG. 18 are applied to the picture element electrodes and the data bus electrodes. At this time, blocks Be and Bg in FIG. 18 indicate that what has been written during the previous field (the first field) is retained without being changed.

During the third field F3, the scanning signal is sequentially applied to the first, third, . . . 2N−1th rows, and at the same time, negative and positive bias voltages are alternately applied to the odd- and even-numbered common line electrodes for each frame (two-field) period. On the other hand, positive and negative data signal voltages are alternately applied to the odd- and even-numbered data bus electrodes in an amplitude corresponding to contents to be displayed. Therefore, voltages of polarities such as shown in blocks Bj and Bl in FIG. 18 are applied to the picture element electrodes and the data bus electrodes. At this time, blocks Bj and Bl in FIG. 18 indicate that what has been written during the previous field (the second field) is retained without being changed.

During the fourth field F4, the scanning signal is sequentially applied to the second, fourth, . . . 2Nth rows, and at the same time, positive and negative bias voltages are alternately applied to the odd- and even-numbered common line electrodes. On the other hand, negative and positive data signal voltages are alternately applied to the odd- and even-numbered data bus electrodes in an amplitude corresponding to contents to be displayed. Therefore, voltages of polarities such as shown in blocks Bn and Bp in FIG. 18 are applied to the picture element electrodes and the data bus electrodes. At this time, blocks Bm and Bo in FIG. 18 indicate that what has been written during the previous field (the first field) is retained without being changed.

During the fifth field (not shown), the voltage of the polarity identical with that during the first field F1 is applied to the picture element electrodes and the data bus electrodes in the same manner, thereby repeating the above cycle. It is to be noted that the sum of data signal voltage corresponding to the contents to be displayed and the bias voltages which have been applied to the common line electrodes is retained for one frame (two-field) period after having been written in the above mentioned liquid crystal cells, but the contents which have been so written will not vary notwithstanding the change in potential resulting from the data signal of the data bus electrodes or the change in bias voltages applied to the common line electrodes, so long as the TFTs are switched off.

Thus, as can be understood from FIG. 18, since as far as the picture in its entirety is concerned, the combination varies for each field and the positive charged picture elements and the negative charged picture elements are equal in number to each other and are positioned in neighboring relationship to each other, the frequency of flickering will be apparently 60 Hz, and therefore, no flicker can be perceived. It is to be noted that, although in the foregoing description the paired positive and negative picture elements have been shown as positioned at intervals of one, they may be positioned at intervals of two.

The structure of the liquid crystal display device of the construction shown in and described with reference to FIG. 16 will now be described with reference to FIG. 17 in terms of a method for making the same. As shown in FIG. 17, a pattern 410 of gate electrodes made of Cr, 2,000 angstroms in thickness, is first formed on an insulating substrate made of, for example, a glass plate, and an insulating film 420, 3,000 angstroms in thickness, of, for example, silicon nitride is subsequently formed over the gate electrode pattern by the use of a CVD technique. Thereafter, an amorphous silicon film 440, 500 angstroms in thickness, is deposited over the insulating film 420, followed by etching to provide amorphous silicon islands 440 which are in turn deposited with phosphorus doped amorphous silicon n+ to a thickness of 2,000 angstroms by the use of a CVD technique. After titanium has been deposited to a thickness of 3,000 angstroms on a front surface by the use of a sputtering technique, the resultant film of titanium is etched to form a pattern of common line electrodes 450 and a drain pad 460. Thereafter, a layer of n+ is etched on the same pattern to form a drain contact 465 and a source contact 455 relative to the amorphous silicon islands 440, thereby completing the TFTs, the gate bus electrodes and the common line electrodes. Then, the substrate as a whole is deposited with an insulating film 425 of silicon nitride by the use of a plasma CVD technique to a thickness of 3,000 angstroms to form electrode lead-out portions and contact holes 470. Furthermore, ITO is deposited to a thickness of 2,000 angstroms and is then etched to complete the picture element electrodes 430. Finally, this substrate is formed with a polyimide film as a liquid crystal molecular orientation film and, after this substrate and an insulating substrate formed by ITO with stripes of counter electrodes (data bus electrodes) D1, D2, . . . and a polyimide film have been subjected to an orienting process by means of rubbing, the both are pasted together with a liquid crystal subsequently injected, thereby to complete the liquid crystal display device of the present invention.

When the liquid crystal display device so made as described above is operated in a normal white mode by the use of the driving method which has been detailed above, a display of high contrast ratio and with no flicker could be obtained. While when a display is to be effected in a guest-host mode in which pigments are added to the liquid crystal, a higher voltage than that required in the normal white mode is required. The voltage applied to the common line electrodes acts as a bias voltage, and therefore, a high contrast ratio could be obtained and no flicker could have been occurred.

It is to be noted that both of the materials for the liquid crystal display device and the method for making the same are not be limited to those described above, and any known material or any known making method can be employed in the practice of the present invention.

As described above, according to the fourth preferred embodiment of the present invention, the active matrix liquid crystal display device is effective to substantially eliminate the occurrence of flickers even when a televised picture is scanned according to the interlaced scanning system when driven by an alternating voltage. Moreover, since the voltage applied to the common line electrodes acts as a bias voltage, a high contrast ratio can be obtained even with a relatively small data signal voltage. Also, a margin relative to any possible variation in output characteristic of a data driver can be increased. Furthermore, since there is no line which would intersect the gate bus electrodes, any possible line defect which would occur when there is a line intersecting the gate bus electrodes will not occur.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

What is claimed is:

1. An active matrix liquid crystal display device operable on an interlaced scanning scheme and having a plurality of liquid crystal cells and switching active elements for driving the liquid crystal cells, said liquid crystal cells and said switching active elements being arranged in a matrix fashion having rows and columns intersection with each other, the device comprising:

a plurality of sets, each comprised of each neighboring members of the rows of the matrix;

means for scanning each set with an interlaced scanning signal during any fields, odd-numbered source lines each connected with one of said row forming the respective set, even-numbered source lines each connected with the other of said row forming the respective set; and means for applying an odd-numbered field signal to said odd-numbered field signal to said even-numbered source line during any field time.

2. The device as claimed in claim 1, wherein gates are paired and scanned during the odd- and even-numbered fields.

3. The device as claimed in claim 1, wherein the source line are divided into the odd- and even-numbered ones and driven.

4. The device as claimed in claim 1, further comprising field memories.

5. An active matrix liquid crystal display device including a plurality of rows of video signal lines, a plurality of columns of scanning lines, said rows of the video signal line and the columns of the scanning lines being arranged in a matrix fashion, a picture element electrode disposed at each of intersecting points between the rows and the columns and adapted to receive a video signal through an active element, said device being adapted to be scanned according to an interlaced scanning scheme by a signal supplied through the scanning lines, the device comprising:

a scanning signal supply means for supplying a signal to each of the scanning lines;

a first video signal supply means for supplying a first video signal to odd-numbered columns of the video signal lines;

a second video signal supply means for supplying a second video signal to even-numbered columns of the video signal lines, said second video signal having a phase displacement of a half-cycle period relative to the first video signal;

first and second picture element electrodes to which the first and second video signals are respectively applied;

a first counter electrode confronting each of the first picture element electrodes;

a second counter electrode confronting each of the second picture element electrodes;

a first counter electrode signal supply means for supplying a first counter electrode signal to the first counter electrodes; and a second counter electrode signal supply means for supplying a second counter electrode signal to the second counter electrodes, said second counter electrode signal having a phase displacement of a half-cycle period relative to the first counter electrode signal.

6. The device as claimed in claim 5, wherein the counter electrodes are divided into odd- and even-numbered source lines.

7. The device as claimed in claim 5, wherein voltages which differ in polarity with each other are applied to odd- and even-numbered source line signals.

8. An active matrix liquid crystal display device which has a first insulating substrate formed with thin film transistors, gate bus electrodes, common line electrodes and picture element electrodes which do not intersect with the gate bus electrodes so as to confront the first insulating substrate and so as to intersect the gate bus electrodes, and a layer of liquid crystal intervening between the first and second insulating substrates, the device comprising:

each of said thin film transistors, which are connected to the same gate bus electrodes, having source and drain electrodes, one of said source and drain electrodes being connected with the picture element electrode and the other of said source and drain electrodes being alternately connected with two common line electrodes confronting with each other with the gate electrode intervening therebetween, said two common line electrodes being applied with voltages different in polarity from each other.

9. The device as claimed in claim 8, wherein each of the voltages applied to the common line electrodes reverses in polarity for each frame.

10. The device as claimed in claim 8, wherein the layer of liquid crystal is twisted nematic, and wherein two polarizing plates sandwiching the liquid crystal layer have respective polarizing directions either parallel or perpendicular to each other.

11. The device as claimed in claim 8, wherein the layer of liquid crystal is nematic liquid crystal added with pigments.

12. The device as claimed in claim 8, wherein gate bus lines and counter electrodes are formed on the same substrate.

13. The device as claimed in claim 8, wherein the data bus electrodes are provided on the opposite substrate.

14. The device as claimed in claim 8, wherein the two counter electrodes are applied with voltages different in polarity from each other.

15. The device as claimed in claim 8, wherein each of the voltages applied to the counter electrodes has its polarity reversed for each frame.

16. The device as claimed in claim 8, wherein the layer of liquid crystal is TN-FE liquid crystal.

17. The device as claimed in claim 8, wherein the layer of liquid crystal is nematic liquid crystal added with pigments.

18. An active matrix liquid crystal display device including a plurality of rows of video signal lines, a plurality of columns of scanning lines, said rows of the video signal line and the columns of the scanning lines being arranged in a matrix fashion, a picture element electrode disposed at each of intersecting points between the rows and the columns and adapted to receive a video signal through an active element, said device being adapted to be scanned according to an interlaced scanning scheme by a signal supplied through the scanning lines, the device comprising:

said video signal lines being comprised of a plurality of pairs of first video signal lines and a plurality of pairs of second video signal lines;

a first video signal supply means for supplying a first video signal to the first video signal lines;

a second video signal supply means for supplying a second video signal to the second video signal lines, said second video signal having a phase displacement of a half-cycle period relative to the first video signal;

a scanning signal supply means for supplying a scanning signal to each of a plurality of sets of odd- and even-numbered scanning lines; and first and second picture element electrodes to which the first and second video signals are respectively applied, said first and second picture element electrodes being arranged in a displacement of a half-cycle period from each other in a direction of the scanning line.

19. The device as claimed in claim 18, wherein a delta arrangement is employed.

20. The device as claimed in claim 18, wherein odd- and even-numbered gate lines are simultaneously scanned for each field.

21. The device as claimed in claim 18, wherein source lines are driven while divided into odd- and even-numbered source lines.

22. The device as claimed in claim 18, wherein 1 Hz video signal per field is displayed for each of odd- and even-numbered gates.

* * * * *